(12) United States Patent
Shida

(10) Patent No.: US 9,378,642 B2
(45) Date of Patent: Jun. 28, 2016

(54) VEHICLE CONTROL APPARATUS, TARGET LEAD-VEHICLE DESIGNATING APPARATUS, AND VEHICLE CONTROL METHOD

(75) Inventor: Mitsuhisa Shida, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 423 days.

(21) Appl. No.: 13/521,515

(22) PCT Filed: Mar. 24, 2011

(86) PCT No.: PCT/IB2011/000625
§ 371 (c)(1),
(2), (4) Date: Jul. 11, 2012

(87) PCT Pub. No.: WO2011/124957
PCT Pub. Date: Oct. 13, 2011

(65) Prior Publication Data
US 2013/0060443 A1  Mar. 7, 2013

(30) Foreign Application Priority Data

Apr. 6, 2010  (JP) ................................ 2010-087974

(51) Int. Cl.
*G08G 1/16* (2006.01)
*G08G 1/00* (2006.01)
*B60W 30/16* (2012.01)
(Continued)

(52) U.S. Cl.
CPC ............ *G08G 1/163* (2013.01); *B60K 31/0008* (2013.01); *B60K 31/0058* (2013.01)

(58) Field of Classification Search
CPC ............................ B60K 21/0058; G08G 1/163

USPC .......................................................... 701/96
See application file for complete search history.

(56) References Cited

U.S. PATENT DOCUMENTS

| 2003/0225519 A1 | 12/2003 | Miyahara |
| 2005/0251313 A1 | 11/2005 | Heinrichs-Bartscher |

(Continued)

FOREIGN PATENT DOCUMENTS

| DE | 10 2008 061 303 A1 | 6/2009 |
| GB | 2 358 506 A | 7/2001 |

(Continued)

OTHER PUBLICATIONS

Camus T, et al. Stereo-Based Vision Systems for AUtomotive Imminent Collision Detection (IEEE Intelligent Vehicles Symposium, 2004).*

(Continued)

*Primary Examiner* — Helal A Algahaim
*Assistant Examiner* — Charles J Han
(74) *Attorney, Agent, or Firm* — Oliff PLC

(57) ABSTRACT

In a target lead-vehicle designating apparatus, a vehicle tracking ECU compares surrounding vehicle information acquired through an inter-vehicle communication unit and vehicle information on preceding vehicles detected by a radar device to designate a target lead-vehicle. The communicated speed of the other vehicles and the detected speed of the preceding vehicles are compared in terms of velocity component in the travel direction of a host vehicle to identify the target lead-vehicle. Accordingly, the target lead-vehicle may be accurately identified even if the target lead-vehicle is close to other vehicles.

5 Claims, 4 Drawing Sheets

(51) Int. Cl.
  *G01C 21/26* (2006.01)
  *B60K 31/00* (2006.01)

(56) References Cited

U.S. PATENT DOCUMENTS

| 2007/0083318 | A1  | 4/2007  | Parikh   |         |
|--------------|-----|---------|----------|---------|
| 2008/0167821 | A1* | 7/2008  | Breed    | 701/301 |
| 2009/0292468 | A1* | 11/2009 | Wu et al.| 701/301 |

FOREIGN PATENT DOCUMENTS

| JP | A-2002-222491    | 8/2002  |
|----|------------------|---------|
| JP | A-2005-115637    | 4/2005  |
| JP | A-2007-280060    | 10/2007 |
| JP | A-2008-46873     | 2/2008  |
| JP | A-2010-231358    | 10/2010 |
| WO | WO 2005/005206 A1| 1/2005  |

OTHER PUBLICATIONS

Jul. 22, 2011 International Search Report issued in International Patent Application No. PCT/IB2011/000625.

Jul. 22, 2011 Written Opinion of the International Searching Authority issued in International Patent Application No. PCT/IB2011/000625.

Jul. 10, 2012 Office Action issued in Japanese Patent Application No. 2010-087974 (with partial translation).

* cited by examiner

VEHICLE CONTROL APPARATUS, TARGET LEAD-VEHICLE DESIGNATING APPARATUS, AND VEHICLE CONTROL METHOD

BACKGROUND OF THE INVENTION

1. Field of the Invention

The present invention relates to a vehicle control apparatus, a target lead-vehicle designating apparatus, and a vehicle control method, and particularly to a vehicle control apparatus, a target lead-vehicle designating apparatus, and a vehicle control method that specify a target lead-vehicle when a plurality of vehicles are traveling in line.

2. Description of the Related Art

Japanese Patent Application Publication No. 2005-115637 (JP-A-2005-115637) describes an apparatus that detects the running circumstances of vehicles around the host vehicle. The apparatus maps the positions indicated by information on vehicles ahead acquired from a radar device and information on vehicles ahead acquired from an inter-vehicle communication device in a mapping area based on the position of the host vehicle, and if overlapping vehicle positions are mapped, the reliability of information indicating the vehicle positions is calculated to estimate the vehicle positions on the basis of the calculated reliability.

The fuel efficiency and mutual safety of a group of vehicles traveling on a road exclusively for automobiles, such as an expressway, may be improved by having the group of vehicles travel in line and avoiding unnecessary acceleration and deceleration along with variations in inter-vehicle distance. When vehicles are traveling in line, it is necessary for a trailing vehicle to specify a leading vehicle and travel in accordance with the position and the speed of the leading vehicle. If the apparatus described in JP-A-2005-115637 is used to designate a target lead-vehicle when the host vehicle has engaged a vehicle-tracking mode, however, it may be difficult to determine which vehicle near the host vehicle should be identified as the target lead-vehicle, and the vehicle selected as the target lead-vehicle may be incorrect.

SUMMARY OF THE INVENTION

The present invention provides a vehicle control apparatus, a target lead-vehicle designating apparatus, and a vehicle control method that precisely specify a target lead-vehicle even if the target lead-vehicle and other vehicles are close to each other.

A first aspect of the present invention is directed to a vehicle control apparatus that includes vehicle circumstance acquisition means for acquiring first information that indicates movement of other vehicles than a host vehicle through communication. The vehicle control apparatus controls the host vehicle using a component, in one direction, of the first information acquired by the vehicle circumstance acquisition means.

In the first aspect, in addition, the first information that indicates the movement of the other vehicles may include at least one of speed and acceleration of the other vehicles.

In the first aspect, in addition, the one direction may be a travel direction of the host vehicle.

In the first aspect, in addition, the one direction may be a direction from the other vehicles to the host vehicle.

The vehicle control apparatus according to the first aspect may further include a front sensor that is mounted on the host vehicle, and the control of the host vehicle may include comparing the acquired first information with second information on vehicles ahead of the host vehicle detected by the front sensor to specify a target lead-vehicle.

In the first aspect, in addition, the control of the host vehicle may further include at least one of an adaptive cruise control that tracks the target lead-vehicle while maintaining a prescribed distance from the target lead-vehicle and a control executed by a pre-crash system that predicts a collision with the target lead-vehicle to avoid a collision with the target lead-vehicle or reduce an impact when a collision with the target lead-vehicle occurs.

A second aspect of the present invention is directed to a target lead-vehicle designating apparatus including control means for comparing surrounding vehicle circumstances acquired through inter-vehicle communication and vehicle information on preceding vehicles acquired through a front sensor mounted on a host vehicle to specify a target lead-vehicle, in which the control means compares a speed acquired through the inter-vehicle communication and a speed acquired through the front sensor with regard to a velocity component in a travel direction of the host vehicle to specify the target lead-vehicle.

Preferably, the control means makes the comparison with regard to the velocity component between vehicles whose position acquired through the inter-vehicle communication and position through the front sensor generally coincide with each other.

A third aspect of the present invention is directed to a vehicle control method. The vehicle control method includes: acquiring first information that indicates movement of other vehicles than a host vehicle through communication; and controlling the host vehicle using a component, in one direction, of the acquired first information that indicates the movement of the other vehicles.

According to the present invention, a target lead-vehicle is specified based on a vehicle velocity component in the travel direction of a host vehicle. Thus, interrupting vehicles and vehicles leaving from a lane on which the host vehicle is running, for example, can be excluded from the target lead-vehicle, which allows precise determination of the target lead-vehicle. The determination precision can be further improved by refinement with reference to positional information.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Figure 1:
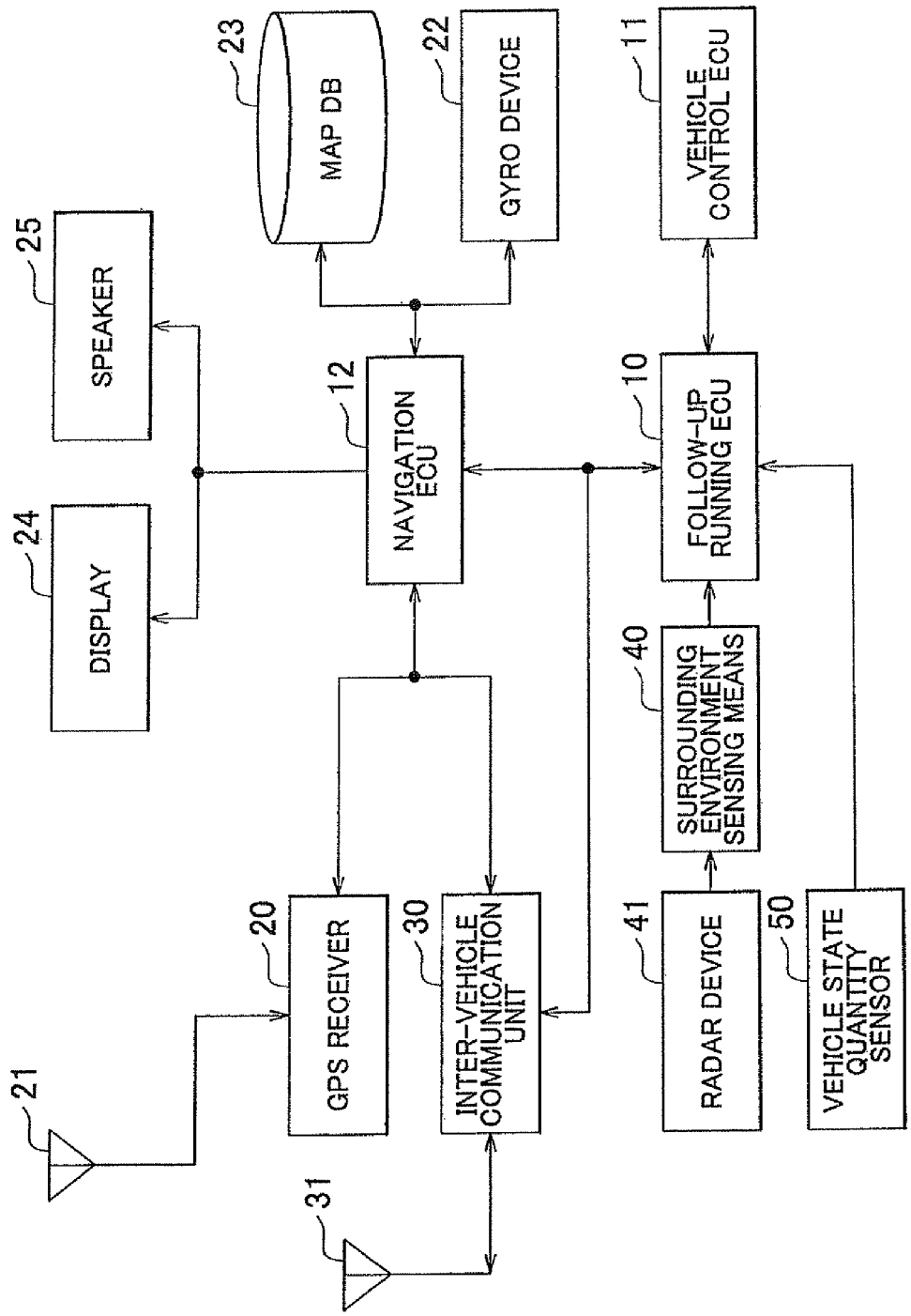
FIG. 1 is a block diagram showing the configuration of a target lead-vehicle designating apparatus according to an embodiment of the present invention.

An example embodiment of the present invention will be described in detail below with reference to the accompanying drawings. In order to facilitate understanding of the description, the same constituent elements in the drawings are denoted by the same reference numerals as much as possible to avoid redundant description.

FIG. 1 is a block diagram showing the configuration of a target lead-vehicle designating apparatus according to the present invention. The apparatus is formed by combining a vehicle tracking ECU 10 that serves as a control section and that forms the main portion of the apparatus, a vehicle control ECU 11 that controls the behavior of a vehicle, a navigation ECU 12 that navigates a route, and so forth. Each of the ECUs is formed by a CPU, a ROM, a RAM, and so forth, and may be formed as dedicated hardware, may be formed by combining a plurality of pieces of hardware, or may share part or all of the hardware. Each ECU may be configured to exchange data using an in-vehicle LAN, for example.

The navigation ECU 12 is connected to a global positioning system (GPS) receiver 20 that receives a signal from a GPS satellite using an antenna 21; an inter-vehicle communication unit 30 that communicates vehicle information (vehicle circumstances) of each vehicle with other vehicles via an antenna 31; a gyro device 22 for autonomous navigation; a map database (DB) 23 that stores map information; a display 24 for display; and a speaker 25 for sound output.

The vehicle tracking ECU 10 receives the output from a surrounding environment sensor 40 that detects obstacles and other vehicles around the vehicle based on the output from a radar device 41 disposed at the front portion of the vehicle, and receives an output from a vehicle state quantity sensor 50 that detects a vehicle state of the host vehicle. Examples of the vehicle state quantity sensor 50 include a wheel speed sensor that detects rotation of each wheel, an acceleration sensor that detects acceleration in the longitudinal direction of the vehicle, a lateral acceleration sensor that detects acceleration in the lateral direction of the vehicle, a yaw rate sensor that detects a yaw rate, and a steering angle sensor that detects a steering angle. The radar device 41 emits an electromagnetic wave (for example, a millimeter wave) forward from the vehicle and receives the wave reflected from other objects to acquire information on the position and the relative speed of the other objects on the basis of the received reflected wave.

Figure 2:
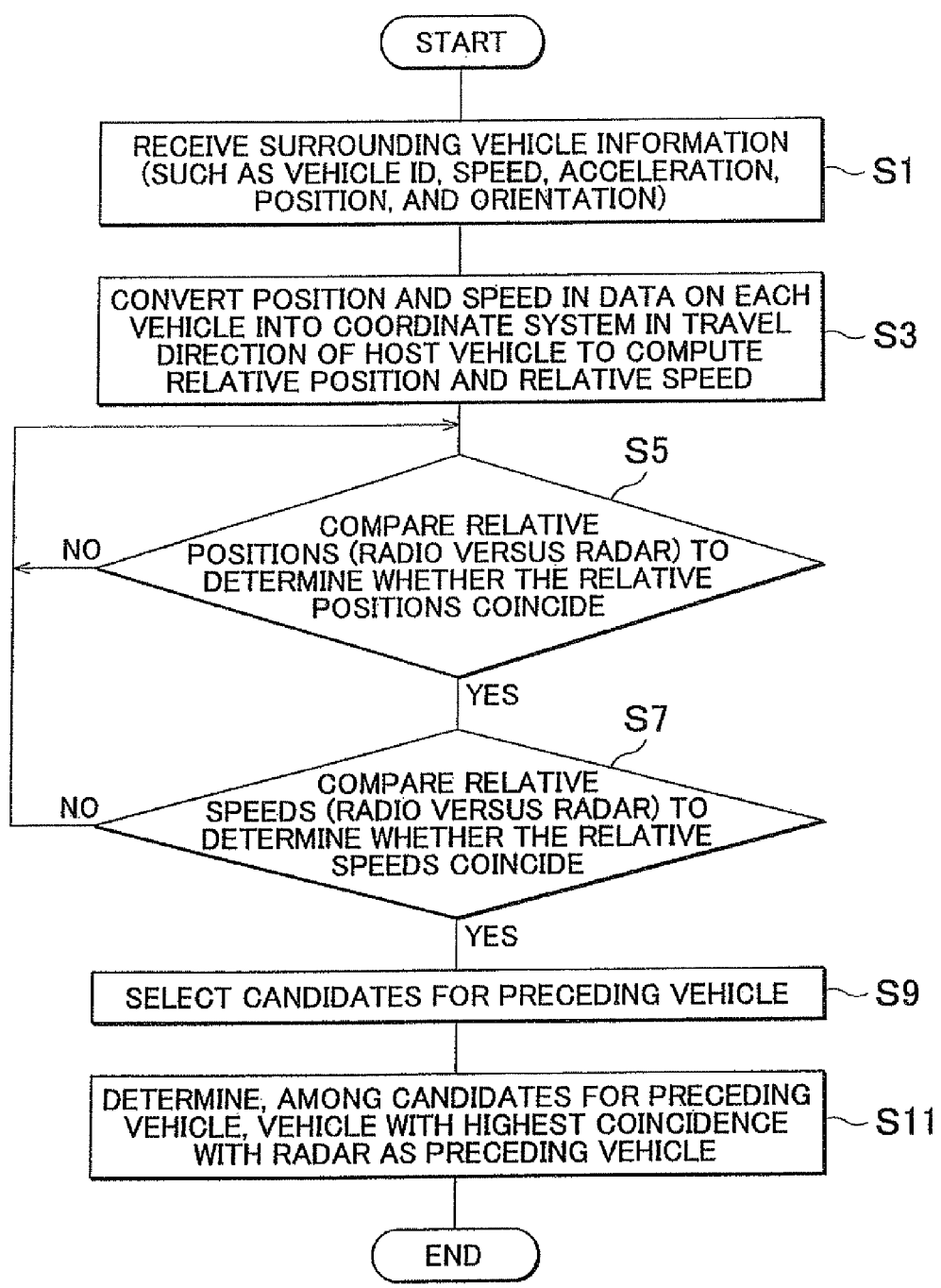
FIG. 2 is a flowchart showing the operation of the apparatus of FIG. 1.

Next, the operation of the apparatus will be described with reference to the flowchart of FIG. 2. The operation is executed by the vehicle tracking ECU 10 in cooperation with the navigation ECU 12 and the vehicle control ECU 11 at prescribed intervals from when the vehicle tracking mode is engaged until when it is canceled, either manually or automatically, when conditions no longer allow vehicle tracking.

First, surrounding vehicle information is received from the inter-vehicle communication unit 30 (step S1). Here, examples of the obtained surrounding vehicle information include the vehicle ID that is unique to each vehicle, and the speed, the acceleration, the position, and the orientation (i.e., the travel direction) of the vehicle. The inter-vehicle communication unit 30 also transmits information on the speed and the acceleration of the vehicle acquired through the vehicle state quantity sensor 50 and the position and the travel direction of the vehicle acquired through the navigation ECU 12 together with the vehicle ID of the host vehicle to other vehicles. Other vehicles also transmit and receive such data. Thus, vehicle information cat be exchanged between vehicles that posses the inter-vehicle communication function. In this event, in the case where positional information is calculated only from GPS data, a large error in the positional information may result. Therefore, the positional information may be corrected in accordance with autonomous navigation data before being transmitted.

Figure 3A:
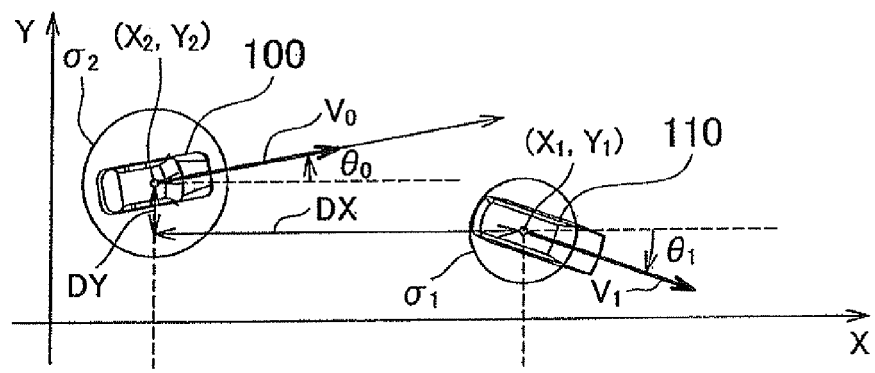
FIGS. 3A and 3B illustrate a coordinate conversion into a host vehicle coordinate system in the apparatus of FIG. 1.
Figure 3B:
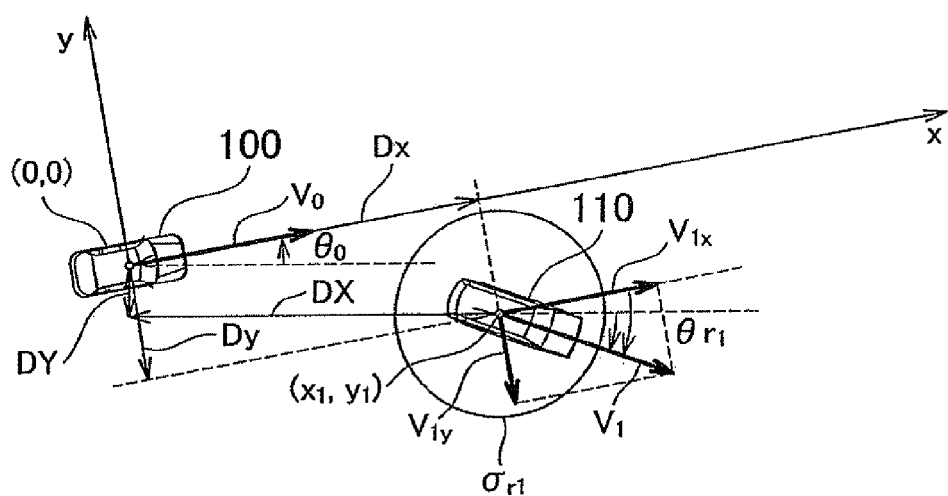

Next, the position and the speed in data on each vehicle obtained as the surrounding vehicle information are converted into a coordinate system that has a coordinate axis in the travel direction of the host vehicle to compute a relative position and a relative speed (step S3). The coordinate system conversion will be described specifically with reference to FIGS. 3A and 3B. The coordinate system that represents the vehicle position and the travel direction in the inter-vehicle communication is defined as an XY coordinate system shown in FIG. 3A. Here, the position coordinates of each vehicle are defined by the positions of the center of gravity of the each vehicle. The position coordinate of a host vehicle 100 in the XY coordinate system is defined as $(X_2, Y_2)$, the position coordinate of another vehicle 110 is defined as $(X_1, Y_1)$, and the radii of errors in position coordinates of the host vehicle 100 and the other vehicle 110 are respectively defined as $\sigma_2$, $\sigma_1$. The speed of the host vehicle 100 is defined as $V_0$, the speed of the other vehicle 110 is defined as $V_1$, and the angles formed between the velocity vectors of the host vehicle 100 and the other vehicle 110 and the X axis are respectively defined as $\theta_0$, $\theta_1$. The coordinate system is converted into a coordinate system shown in FIG. 3B in which the position of the center of gravity of the host vehicle 100 is defined as the origin, the direction of the velocity vector of the host vehicle 100 is defined as the x axis, and the direction orthogonal to the direction of the velocity vector of the host vehicle 100 is defined as the y axis.

Because this conversion is a rotational transform, the following formula is met:

$$\begin{pmatrix} Dx \\ Dy \end{pmatrix} =$$

$$\begin{pmatrix} x_1 \\ y_1 \end{pmatrix} = \begin{pmatrix} \cos\theta_r & \sin\theta_r \\ -\sin\theta_r & \cos\theta_r \end{pmatrix}\begin{pmatrix} DX \\ DY \end{pmatrix} = \begin{pmatrix} DX\cos\theta_r + DY\sin\theta_r \\ -DX\sin\theta_r + DY\cos\theta_r \end{pmatrix}$$

$$\begin{cases} DX = X_1 - X_2 \\ DY = Y_1 - Y_2 \end{cases}$$

Equation 1

The error $\sigma_{r1}$ in relative position can be obtained by the following formula using the additivity of variance:

$$\sigma_{r1} = \sqrt{\sigma_1^2 + \sigma_2^2}$$

Equation 2

Then, because the angle $\theta_1$ formed between the velocity vector of the other vehicle 110 and the x axis is $(\theta_1-\theta_0)$, a velocity component $V_{1x}$ of the speed $V_1$ in the travel direction of the host vehicle 100 (the direction of the x axis) may be represented by the following formula:

$$V_{1x} = V_1 \cos\theta_{r1}$$

Equation 3

Next, from the relative positions of the other vehicles 110 acquired using the radar device 41 and the relative positions of the other vehicles 110 calculated in step S3, such relative positions that are within a predetermined distance from each other, that is, that match each other within the range of the error $\theta_{r1}$ discussed above, for example, are extracted (step S5). Subsequently, from the extracted relative positions, such relative positions that coincide with each other in terms of relative speed in the travel direction of the host vehicle 100 within a predetermined error range threshold value Vth are extracted (step S7). In the example shown in FIG. 3B, the difference $(V_{1x}-V_0)$, which corresponds to the difference between $V_{1x}$ and $V_0$, calculated in step S3 is the relative speed of the other vehicle 110, whose surrounding vehicle information was obtained, to the host vehicle 100 in the travel direction of the host vehicle 100. The relative speed obtained from the surrounding vehicle information is compared with a relative speed $V_r$ acquired through the radar device 41. It may be determined that the relative speeds match each other if the difference between the relative speeds is within ±Vth. The threshold value Vth is set based on the measurement precision of the radar device 41 and the navigation system, for example.

A vehicle that satisfies such conditions and that thus is extracted is set as a candidate for a lead-vehicle (step S9). When there is a plurality of candidate lead-vehicles, the vehicle with the highest degree of coincidence is identified as the preceding vehicle (step S11). The vehicle control ECU 11 adjusts the speed of the host vehicle by controlling the state of an engine and a brake to follow the other vehicle 110 identified as the lead-vehicle.

Figure 4:
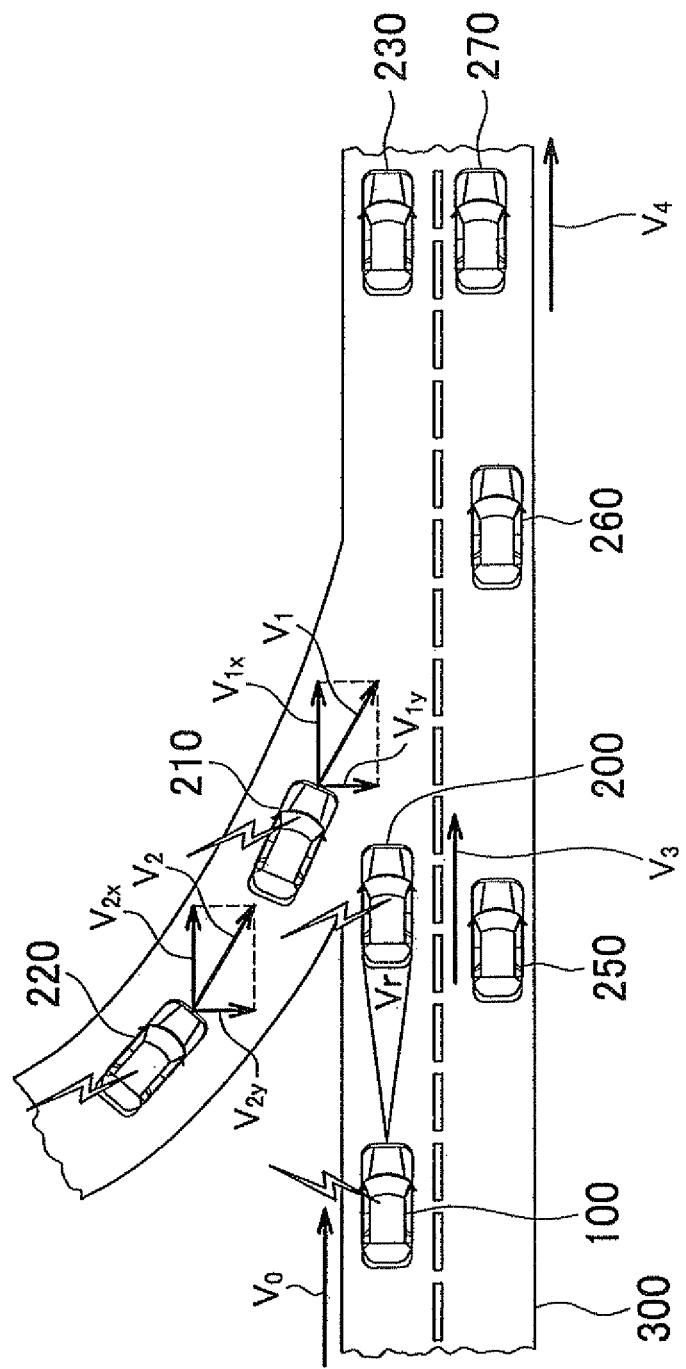
FIG. 4 illustrates how a target lead-vehicle is specified in the apparatus of FIG. 1.

FIG. 4 illustrates how the target lead-vehicle designating apparatus according to the present invention designates a lead-vehicle. The host vehicle 100 is positioned before a merging section, and other vehicles 200 to 220 are located at positions near the merging section. The velocity components $V_{1x}$ and $V_{2x}$, in the travel direction of the host vehicle 100, of the vehicles 210 and 220, which are attempting to enter the lane in which the host vehicle 100 is traveling, are below the actual speeds V1 and V2 of the vehicles 210 and 220 because of the difference in travel direction of the other vehicles 200 to 220, even if the speeds $V_1$ to $V_3$ of the other vehicles 200 to 220 are approximate to each other. However, the velocity component, in the travel direction of the host vehicle 100, of the vehicle 200, which should be followed by the host vehicle 100, coincides with the actual speed $V_3$ of the vehicle 200, and thus substantially coincides with the velocity component acquired by the radar device 41. Therefore, the vehicle 200 may be reliably specified as the target lead-vehicle rather than the vehicles 210 and 220 which are attempting to enter the lane and vehicles 230 to 270 that are farther away from the host vehicle 100.

In the above description, a radar device is used as a front sensor. However, an infrared ray sensor or an ultrasonic sonar may also be used. Alternatively, a front camera may be used to acquire images, from which images of other vehicles may be acquired through image processing, and the distance and speed of the other vehicles may be determined based on the acquired images of the other vehicles.

The target lead-vehicle designating apparatus according to the present invention may be applied to controls performed by a pre-crash system that predicts a collision with a target lead-vehicle to avoid a collision with the target lead-vehicle and that reduces the force of a collision with the target lead-vehicle if such a collision occurs.

While the invention has been described with reference to example embodiments thereof, it is to be understood that the invention is not restricted to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. A vehicle control apparatus that controls a host vehicle, the vehicle control apparatus comprising:
an inter-vehicle communication unit configured to acquire first information that indicates movement of other vehicles, which are different than the host vehicle, through inter-vehicle communication, the first information that indicates the movement of the other vehicles including at least one of speed and acceleration of the other vehicles;
a front sensor that is mounted on the host vehicle and that obtains second information about preceding vehicles located ahead of the host vehicle; and
an electronic control unit that controls the host vehicle,
wherein the electronic control unit is configured to (i) confirm whether positions of the preceding vehicles detected by the front sensor and positions of the other vehicles acquired through the inter-vehicle communication generally coincide with each other, (ii) for each such coinciding vehicle, compare (a) a speed of the coinciding vehicle in a travel direction of the host vehicle determined from the first information acquired for the coinciding vehicle and (b) the speed of the coinciding vehicle determined from the second information obtained by the front sensor for the coinciding vehicle, and (iii) identify one of the coinciding vehicles as a target lead-vehicle based on a result of comparing (a) and (b) so that the target vehicle is identified as the coinciding vehicle having a highest coincidence between (a) and (b).

2. The vehicle control apparatus according to claim 1, wherein the control of the host vehicle further includes at least one of an adaptive cruise control that tracks the target lead-vehicle while maintaining a prescribed distance from the target lead-vehicle and a control executed by a pre-crash system that predicts a collision with the target lead-vehicle to avoid a collision with the target lead-vehicle or to reduce an impact when a collision with the target lead-vehicle occurs.

3. The vehicle control apparatus according to claim 1, wherein the electronic control unit confirms that the position of one of the preceding vehicles detected by the front sensor and the position of one of the other vehicles acquired through the inter-vehicle communication generally coincide with each other when the positions are within a predetermined distance of each other.

4. A vehicle control method of controlling a host vehicle, the method comprising:
acquiring first information that indicates movement of other vehicles, which are different than the host vehicle, through inter-vehicle communication between the host vehicle and the other vehicles, the first information that indicates the movement of the other vehicles including at least one of speed and acceleration of the other vehicles;
acquiring second information on preceding vehicles located ahead of the host vehicle by using a front sensor of the host vehicle;
confirming whether positions of the preceding vehicles detected by the front sensor and positions of the other vehicles acquired through the inter-vehicle communication generally coincide with each other;
for each such coinciding vehicle, comparing (a) a speed of the coinciding vehicle in a travel direction of the host vehicle determined from the first information acquired for the coinciding vehicle and (b) the speed of the coinciding vehicle determined from the second information obtained by the front sensor for the coinciding vehicle; and
identifying one of the coinciding vehicles as a target lead-vehicle based on a result of comparing (a) and (b) so that the target vehicle is identified as the coinciding vehicle having a highest coincidence between (a) and (b).

5. The vehicle control method according to claim 4, wherein the confirming step confirms that the position of one of the preceding vehicles detected by the front sensor and the position of one of the other vehicles acquired through the inter-vehicle communication generally coincide with each other when the positions are within a predetermined distance of each other.

* * * * *